CIRCUIT ARRANGEMENT WHICH ENABLES SUBSCRIBER CONTROLLED SPECIAL SERVICE FEATURES WITHIN A SWITCHING SYSTEM AT A FUTURE PREDETERMINED TIME

Filed Dec. 24, 1964 8 Sheets-Sheet 1

INVENTORS S. KANDEL
C. C. NIELSON
BY
R. C. Winter
ATTORNEY

Jan. 9, 1968 S. KANDEL ETAL 3,363,063

CIRCUIT ARRANGEMENT WHICH ENABLES SUBSCRIBER CONTROLLED SPECIAL SERVICE FEATURES WITHIN A SWITCHING SYSTEM AT A FUTURE PREDETERMINED TIME

Filed Dec. 24, 1964 8 Sheets-Sheet 2

TRANSFER CCT. 7

REPERTORY CHANGE REGISTER TRUNK 22

REPERTORY ADMINISTRATOR 1030

Jan. 9, 1968 S. KANDEL ETAL 3,363,063

CIRCUIT ARRANGEMENT WHICH ENABLES SUBSCRIBER CONTROLLED SPECIAL SERVICE FEATURES WITHIN A SWITCHING SYSTEM AT A FUTURE PREDETERMINED TIME

Filed Dec. 24, 1964 8 Sheets-Sheet 7

Jan. 9, 1968 S. KANDEL ET AL 3,363,063

CIRCUIT ARRANGEMENT WHICH ENABLES SUBSCRIBER CONTROLLED SPECIAL SERVICE FEATURES WITHIN A SWITCHING SYSTEM AT A FUTURE PREDETERMINED TIME

Filed Dec. 24, 1964

8 Sheets-Sheet 8

United States Patent Office 3,363,063
Patented Jan. 9, 1968

3,363,063

CIRCUIT ARRANGEMENT WHICH ENABLES SUBSCRIBER CONTROLLED SPECIAL SERVICE FEATURES WITHIN A SWITCHING SYSTEM AT A FUTURE PREDETERMINED TIME

Samuel Kandel, Columbus, and Carl C. Nielson, Granville, Ohio, assignors to Bell Telephone Laboratories, Incorporated, New York, N.Y., a corporation of New York Filed Dec. 24, 1964, Ser. No. 421,006
14 Claims. (Cl. 179—18)

This invention relates generally to switching systems, and particularly to subscriber controlled special service features within such systems. More particularly, this invention pertains to circuit arrangements which enable the programming of centralized special service equipment by means of signals from the subscriber's subset and which are responsive to additional signals from the subset to selectively cause activation of such program at a future time.

The telephone, considered at one time as a substitute for face-to-face communication only in rare instances, has risen to a point today where it is an integral and necessary part of modern society. The telephone has become an extension of the person in everyday business and social life, thereby removing distance as a practical barrier to the conduct of most human affairs.

As society increases in complexity, the demands upon the telephone continue to increase to the point where mere voice communication from one fixed location to another does not satisfy public demand. Accordingly, to meet this demand, numerous special service features have been provided to render telephone service more convenient and more flexible.

A typical example of these features is the centralized abbreviated dialing arrangement disclosed in Malthaner-Vaughan Patent No. 2,951,908, dated September 6, 1960, wherein a subscriber station is enabled to selectively program centralized memory equipment. As as result, upon the subsequent dialing of any one of a number of brief codes by the subscriber, a connection is automatically completed to a corresponding location which would otherwise require the dialing of a full, comparatively lengthy, directory number.

Another example is an arrangement disclosed in Wicks Patent No. 2,274,759, issued March 3, 1942, wherein the subscriber controls special service equipment such that upon the subsequent completion of an incoming call to the subscriber's line the connection is automatically transferred to a remote telephone location as arbitrarily determined in advance by the subscriber.

The foregoing and other similar features greatly extend the range and flexibility of telephone service. However, as presently known in the art, such features are activated immediately upon the exercise of control of the special service equipment by the privileged station. As a result, for example, where the abbreviated dialing feature is extended to a business concern, it is not possible to make changes in the dialing repertory during lulls in the business day unless such changes are to be immediately effective. Thus, such changes must be delayed until the beginning of the succeeding business day with an attendant increase in expense and inconvenience to the customer.

In the case of the Wicks arrangement for temporary transfer, quite often the feature is exercised in connection with a scheduled trip to a remote location to which subsequent incoming calls are to be directed. In view of the immediate enabling of the feature, such calls are often completed to the remote point prior to the arrival of the subscriber with resultant confusion and inefficiency.

An examination of other special services, similar to the abbreviated dialing and temporary transfer features discussed above, reveals that in each instance the convenience which the feature seeks to provide is diminished significantly by the absence of subscriber control over the time at which such feature is to be activated.

In view of the foregoing, it is clear that a need exists for an arrangement which will permit a subscriber to delay activation of a special service feature until a selectively determined future time.

Accordingly, it is an object of this invention to provide a circuit arrangement of simple and economical construction which serves to activate a special service feature at a future time under subscriber control.

It is another object of this invention to provide a circuit arrangement, operative to control the subsequent activation of a special service feature, which is controlled by a privileged subscriber in a simple manner not requiring elaborate subscriber instruction.

It is a further object of this invention to provide a circuit arrangement to accomplish the foregoing which is equally applicable to all subscriber controlled special service features currently known in the art.

It is another object of this invention to accomplish the foregoing without necessitating significant changes in the existing equipment provided to control the special service feature.

These and other objects of the invention are attained in accordance with an exemplary embodiment wherein a telephone system includes control circuitry responsive to signals from a special service subscriber station which control centrilzed special service memory equipment.

In the embodiment each special service line is provided with an auxiliary line appearance in the system switching network in addition to the regular line appearance. A transfer circuit associated with the regular line appearance is activated in response to time value information priorly stored in the memory by the special service station, to cause subsequent incoming connections to the regular line appearance to be completed outward from the auxiliary line appearance to another location based upon directory number information read out of the memory.

The memory control circuitry is arranged such that upon the reception from the special service station of the directory number information associated with the special service feature, an audible signal is returned to the customer's line. This audible signal indicates to the special service customer that additional information may thereupon be transmitted to indicate the desired amount of time, if any, which is to elapse before the transfer feature is enabled.

Upon receiving this latter information, the control circuitry is arranged to record in the memory the directory number associated with the special service feature for subsequent use. The additional information received from the privileged customer, indicating the amount of time which should elapse before such enablement, is utilized to control an adder circuit which increases the value of a clock circuit output by an amount corresponding to the desired elapsed time value. This increased time value is thereupon stored in the special service memory and is compared at intervals with the current clock output to cause the enabling of the special service equipment when the stored time value is equal to or exceeded by the current clock output.

Accordingly, when the current clock output is identical to or exceeds the priorly stored time value, the control circuitry associated with the special service auxiliary line appearance is rendered operative so as to cause subsequent functioning of the transfer feature as determined by the initially transmitted directory number information received from the privileged line.

Upon the subsequent dialing of a predetermined code from the privileged station, the information priorly stored in the memory is inhibited and the temporary transfer feature is deactivated.

In accordance with one feature of our invention, centralized special service equipment is arranged to respond to signals from a privileged subscriber line indicating subsequent activation of a special service feature at a selected future time.

In accordance with another feature of our invention, control circuitry is arranged to recognize the reception of directory number information required for activation of a special service feature and to thereupon activate additional equipment operative to register a transmitted time value.

In accordance with another feature of our invention, control circuitry is arranged to indicate to a calling special service line the availability of auxiliary equipment operative to register a transmitted time value.

In accordance with still another feature of our invention, centralized special service memory equipment is arranged to store a future time value determined by the addition of an arbitrary time value indication to an existing present time value indication.

The foregoing objects and features, as well as others, of our invention will be more apparent from the following description of the drawing, in which.

It will be noted that FIGS. 2 through 8 employ a type of notation referred to as "detached-contact" in which an "X," shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, volume 74, pages 505–513.

The present invention is illustrated in an automatic telephone system wherein common control circuits including centralized memory equipment are employed to control the establishment of calls through a switching network. One such system is the automatic switching system disclosed in the A. J. Busch Patent No. 2,585,904 issued February 19, 1952, as modified by the addition of centralized memory equipment disclosed in the Malthaner-Vaughan Patent No. 2,951,908 issued Sept. 6, 1960. The particular manner in which these two disclosures are combined is typified by the copending application Serial No. 240,058, filed Nov. 26, 1962, by Kandel-Krom-Nielson-Zarouni, now Patent 3,206,554, issued Sept. 14, 1965. It is to be understood, however, that the present invention is not limited to use in a telephone system of this type, but may be utilized in other types of switching systems.

Figure 1:
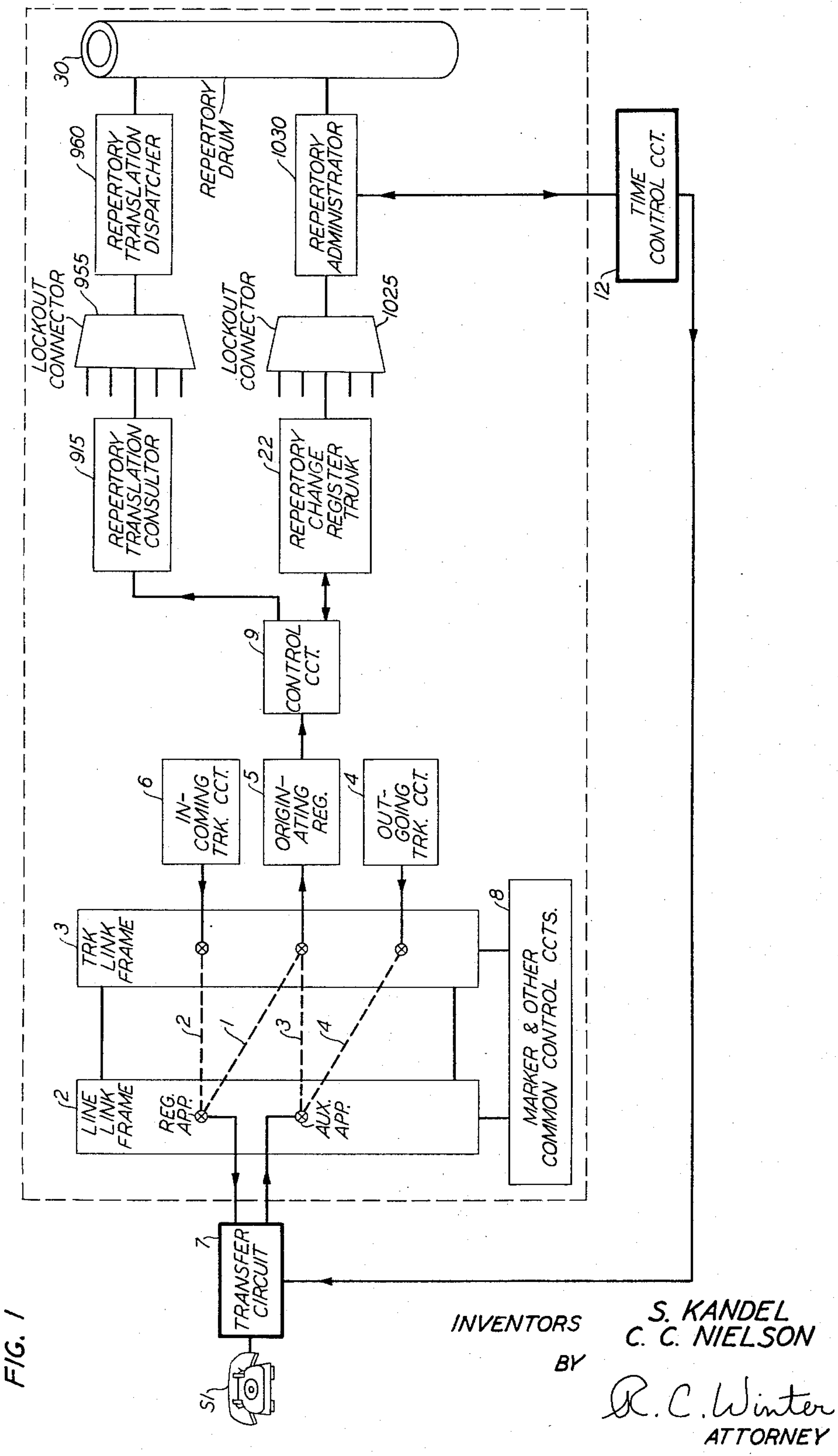
FIG. 1 is essentially a block diagram showing the interrelation of the exemplary embodiment of the invention.

The invention described herein is particularly concerned with apparatus in time control circuit 12 and transfer circuit 7 which are represented by the blocks shown with heavy lines in FIG. 1 in order to distinguish them from the prior art equipment units, which are neither shown nor described in detail except where necessary for a complete understanding of the invention.

For the purpose of illustration, it is intended that the apparatus of line link frame 2, trunk link frame 3, outgoing trunk 4, originating register 5, incoming trunk 6, and marker and other common control circuits 8 correspond to apparatus disclosed in the Busch patent, and that repertory change register trunk 22, lockout connector 1025, repertory administrator 1030, repertory consultor 915, lockout connector 955, repertory translation dispatcher 960, and repertory drum 30 correspond to apparatus disclosed in the Malthaner et al. patent. It is further intended that control circuit 9 corresponds to apparatus disclosed in the copending Kandel et al. application which, as hereinbefore set forth, teaches the manner in which the Busch switching system is interconnected with the Malthaner et al. magnetic memory system. For a more complete understanding of the construction and operation of these components, the appropriate patent or application as set forth above may be consulted.

1. *General description*

The interrelation and function of equipment units of the exemplary embodiment will now be described with reference to FIG. 1 wherein the interconnection of circuit blocks have been designated by arrows to show the direction of circuit action. Prior to beginning a description of the invention, the temporary transfer feature, its purpose and its function will be described.

1.1. *Temporary transfer feature*

The temporary transfer feature is an arrangement provided for the convenience of a subscriber who finds it necessary to be away from his assigned station location for various periods of time and desires that calls which terminate at the assigned station during these periods be forwarded to another location where the subscriber may be reached. This feature is most appropriate where the subscriber finds it is necessary to proceed to any one of a large number of other locations during his absence.

Proceeding now with the description; a station S1, FIG. 1, which is provided with the temporary transfer service, is shown connected to line link frame 2. The outgoing trunk 4, originating register 5 and incoming trunk 6 are shown connected to trunk link frame 3. As is fully disclosed in the Busch patent, lines terminated on line link frames and trunks or registers terminated on trunk link frames are interconnected, when active, by means of crossbar switches on these frames and by interframe junctors. All such interconnections are effected under control of a common group of circuits including marker and other common control circuits 8.

Control circuit 9 is shown interconnected between orginating register 5 of the Busch system and repertory change register 22 and repertory translation consultor 915 of the Malthaner et al. system. As set forth in detail in the Malthaner et al. system, repertory change register trunk 22, lockout connector 1025 and repertory administrator 1030 are utilized to perform the write function in connection with the recording of information in repertory drum 30. Repertory translation consultor 915, lockout connector 955 and repertory translation dispatches 960 are utilized to perform the read function in connection with the interrogation of repertory drum 30 in order to obtain information priorly stored therein.

As set forth in the Kandel et al. application, control circuit 9 is interposed between the Busch system and the Malthaner system such that, when a special service station dials a code indicating a write function, repertory change register trunk 22 is connected to the line to accept the dialed information. Upon completion of the write function, control circuit 9 is arranged to automatically enable the read function as a verification check of the information stored in the memory during the write function. Thus, repertory translation consultor 915 is called in as though the customer had initiated a read function. The information stored in repertory drum 30 is read out and is returned to originating register 5. Originating register 5 thereupon causes the connection to be completed in the conventional manner. Accordingly, if the information stored in repertory drum 30 by station S1 were that of a directory number of a station located in another central office, such directory number is automatically read out upon completion of the write function and a connection is completed to the directory number at the remote central office as a verification of the information priorly stored in the memory.

As will be more apparent hereinafter, while the foregoing system is described in the recited teachings in connection with the provision of an abbreviated dialing function, the identical system is utilized in the instant embodiment in connection with the provision of the temporary transfer feature.

1.2. *Activation of temporary transfer feature for station S1*

We shall assume that the subscriber at station S1 desires to cause subsequent activation of the temporary transfer feature at this time. Referring to FIG. 1, when the subscriber removes the handset from the subset at station S1, connection 1 is completed from the station S1 regular appearance on line link frame 2 to an originating register 5 on trunk link frame 3 as set forth in the Kandel et al. application. As further set forth therein, control circuit 9 is activated in response to the dialing of an alerting code by station S1 to cause the completion of a connection from originating register 5 through to repertory change register trunk 22. Dial tone is thereupon transmitted by repertory change register trunk 22 to indicate to station S1 that the appropriate information may be transmitted.

We shall assume that the subscriber at station S1 has been informed that an alerting code, such as the digits 38 followed by the directory number of the location to which subsequent calls are to be directed, will cause the programming of repertory drum 30 in connection with the temporary transfer feature. Upon the dialing of this information by station S1, dial tone is again transmitted to station S1 by repertory change register trunk 22 as an indication that the subscriber may now dial four digits indicating the amount of time in hours and minute which are to elapse before the temporary transfer feature is to be activated.

Deviating momentarily, it is, of course, obvious that numerous other arrangements as to the number of digits or their significance may be provided without deviating from the scope of the invention.

Continuing now with the description; upon the recording of this latter information repertory change register trunk 22, a connection is completed through lockout connector 1025 to repertory administrator 1030 as set forth in the Malthaner et al. patent. As further set forth therein, the directory number information transmitted by station S1 is recorded in the slot in repertory drum 30 which is addressed by the prefixed code 38. As will be more apparent hereinafter, the elapsed time information transmitted by station S1 is processed through time control circuit 12 which provides an output to repertory administrator 1030 constituting the arithmetic sum of a present time value indication and the delay time value indication provided by station S1. This output is thereupon recorded in repertory drum 30 in the slot assigned to the temporary transfer feature (viz, in the slot addressed by the digits 38).

We shall assume at this time that the subscriber at station S1 does not utilize the memory verification feature disclosed in the Kandel et al. application. Thus, upon the writing of the foregoing information in repertory drum 30, as manifested by an audible signal to station S1, the subscriber at station S1 abandons the connection. It will be noted at this time that although repertory drum 30 has been provided with the information necessary for the temporary transfer feature to be performed, the feature has not as yet been activated since transfer circuit 7 remains in its normal inoperative state. Thus, incoming calls to station S1 are completed in the conventional manner.

As will be more apparent hereinafter, during the periods when repertory drum 30 is not serving other calls, time control circuit 12 compares the future time value stored in repertory drum 30 with the output of a current time value source. When a match is obtained between these two time value indications or the current time value is greater than the stored time value, control circuit 12 generates a start signal to activate transfer circuit 7.

As a result of the activation of transfer circuit 7, subsequent incoming calls to the regular appearance of station S1 are extended through transfer circuit 7 via the associated auxiliary appearance to control a dial tone request in the well-known fashion. Thus, assuming that an incoming call via incoming trunk 6 is completed via connection 2 to the station S1 regular appearance, an originating register, such as originating register 5, is connected via connection 3 to the transfer circuit 7 auxiliary appearance. As will be more apparent from that which is contained hereinafter, a dial tone bid from any auxiliary appearance associated with a transfer circuit, such as transfer circuit 7, causes the artificial generation of the digits 38 in the connected originating register. In response to the registration of these digits, control circuit 9 is enabled to activate the memory equipment read function. Accordingly, repertory translation consultor 915 receives the digits 38 which are thereupon forwarded to repertory translation dispatcher 960 to cause the readout of the directory number stored in repertory drum 30 in the slot assigned to the digits 38 for special service station S1. It will be noted, of course, that this directory number is the directory number priorly stored there by station S1.

The directory number information is returned from repertory drum 30 to originating register 5 which, in response to the registration of a directory number as set forth in detail in the Busch patent, causes the selection of a marker such as marker 8. Register 5 thereupon forwards this information to marker 8, which causes the completion of a connection through the switching network to the designation indicated by the directory number. For purpose of explanation, we shall assume that this connection extends via connection 4 from the auxiliary appearance of transfer circuit 7 through to outgoing trunk 4 on trunk link frame 3.

Thus, at this time a transfer connection has been completed via incoming trunk 6, connection 2 to the regular appearance of station S1, via transfer circuit 7 to the auxiliary appearance, and connection 4 to outgoing trunk 4 to the called destination. As set forth in the Busch patent, during the process of establishing this connection, the marker causes the release of the priorly established connection 3 which extended through to originating register 5. Accordingly, the call is completed to the remote location presently occupied by the subscriber associated with station S1 and conversation may ensue in the conventional manner.

As will be more apparent hereinafter, when the subscriber returns to the station S1 location and dials a predetermined code in the same manner as set forth for the activation code, the directory number information priorly stored in repertory drum 30 is inhibited and transfer circuit 7 is deactivated. Subsequent incoming calls to the regular appearance of station S1 are thereafter completed in the conventional manner.

3. *Detailed description*

The details of circuit operation regarding all circuit units shown in FIG. 1, other than transfer circuit 7 and time control circuit 12, are set forth in detail in the aforementioned patents and application which are hereby made a part of this specification as though contained in detail herein. Accordingly, this information will not be repeated. In the following section, the circuit operation of transfer circuit 7 and time control circuit 12, their association with the respective circuit units of the prior art, and their association with each other will be described in detail.

2.1. *Detailed circuit operation of transfer circuit 7*

Figure 2:
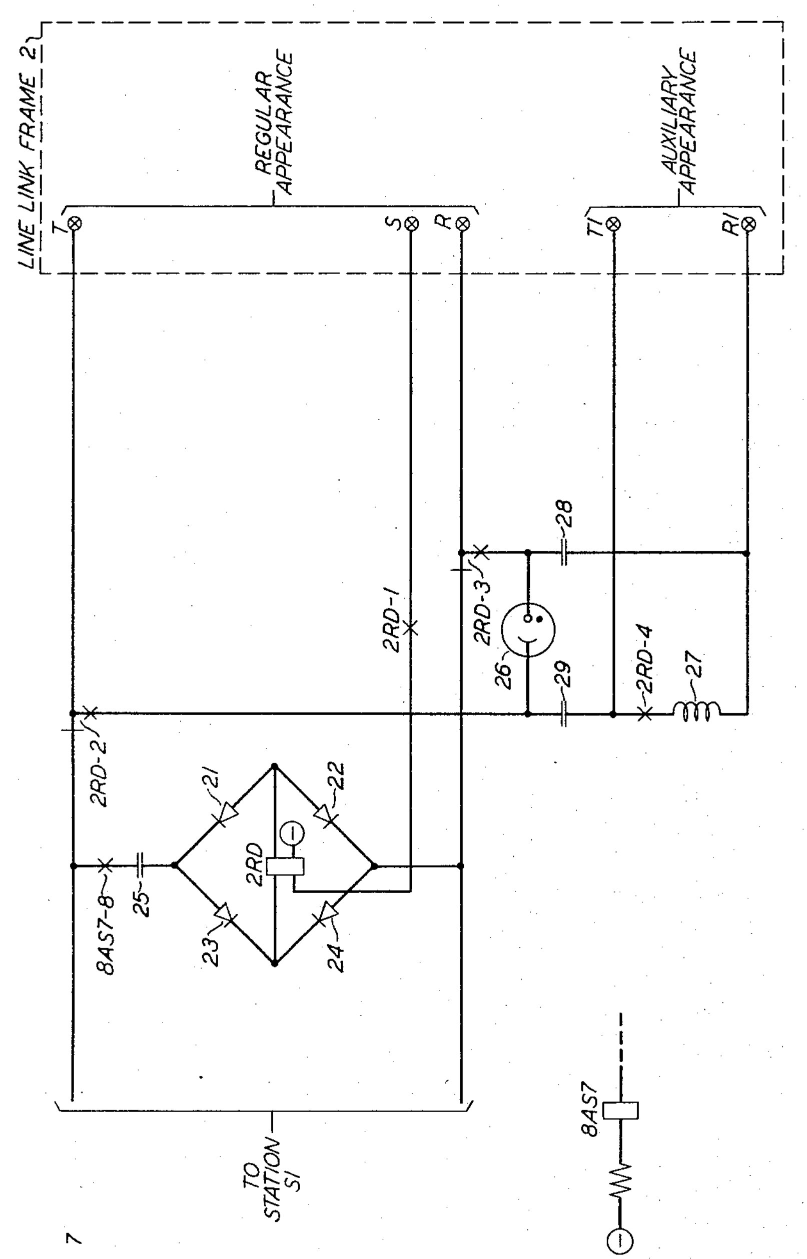
FIGS. 2 through 8 show in greater detail some of the exemplary embodiments of the invention.
Figure 3:
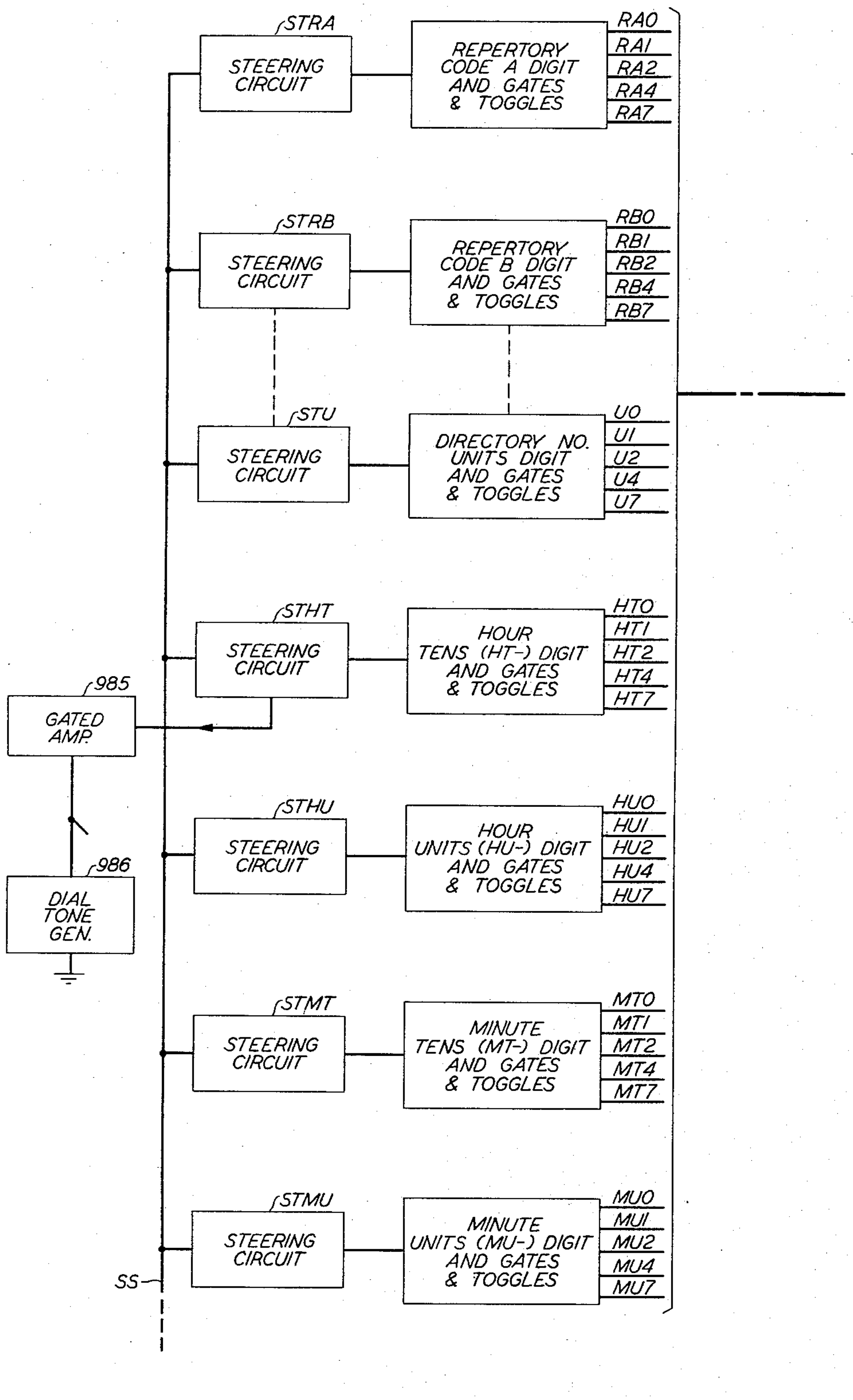
Figures 8, 9:
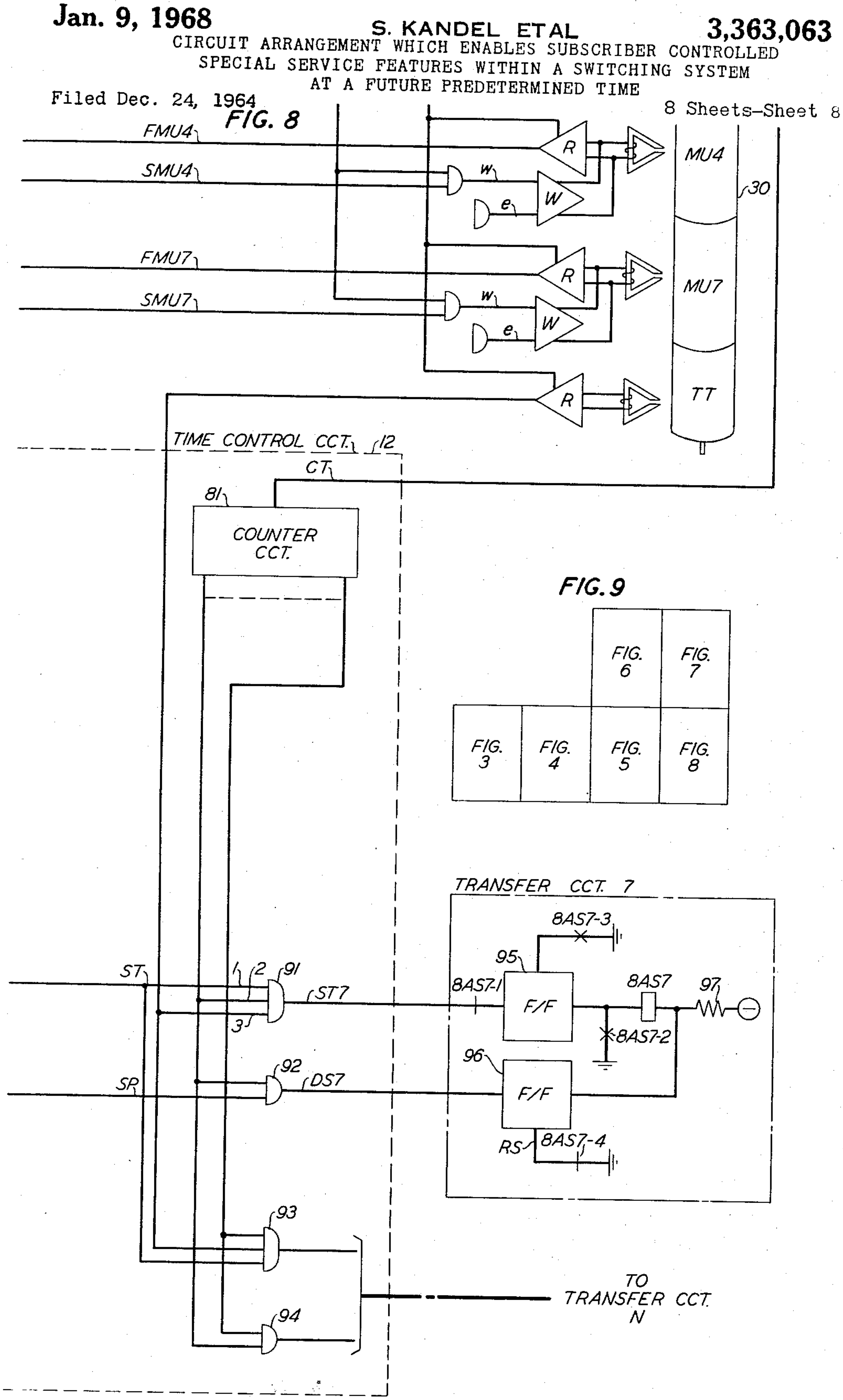
FIG. 9 shows the manner in which the other figures should be arranged.

FIG. 2 shows the manner in which the regular appearance of station S1 is connected through transfer circuit 7 to the associated auxiliary appearance. As will be more apparent hereinafter, the enabling of transfer circuit 7 relay 8AS7 (the detailed operate path of which is shown in FIG. 8) enables make contact 8AS7–8 so as to insert a ringing detection network comprising diodes 21, 22, 23, 24 and relay 2RD in series with capacitor 25 across the T and R leads of the station S1 regular appearance. Accordingly, when ringing potential is applied to the T and R conductors in the well-known manner during the completion of an incoming connection to station S1 the operated state of the 8AS7–9 make contact applies the potential to the ringing detection network thereby operating relay 2RD by an obvious circuit. The operation of associated transfer contacts 2RD–2 and 2RD–3 transfers the regular appearance T and R conductors, respectively, through to gas tube 26. Gas tube 26 accordingly conducts in response to the application of the ringing potential, and as a result inserts what amounts to a momentary D-C short across the T and R conductors sufficient to trip ringing in the well-known manner.

The enabling of make contact 2RD–4 extends continuity between the T1 and R1 conductors of the auxiliary appearance through coil 27. As set forth in detail in the Busch patent, the completion of a continuous path between H and R conductors of a line link frame appearance causes the completion of a dial tone connection to that appearance by the connection thereto of an originating register such as originating register 5 (FIG. 1). As further set forth in the Busch patent, a preassigned class of service associated with each line link frame appearance determines the type of treatment which the associated line is to receive. In the instant arrangement this class of service is advantageously arranged to indicate to register 5 that the code represented by the digits 38 may be automatically generated therein. This may be accomplished in numerous ways; for example, in identical fashion to that set forth for the manual class of service described in the aforesaid Busch patent wherein the register artificially generates the digit 0 to indicate an operator call in response to a dial tone bid from a line link frame appearance arranged for manual service.

In response to the registration of the digits 38, register 5 recognizes a request to enable the memory read function and accordingly passes this information to repertory translation consultor 915 via control circuit 9 (FIG. 1).

As set forth in detail in the Malthaner patent, repertory translation consultor 915 enables repertory translation dispatcher 960 via lockout connector 955 to cause a readout of the directory number stored in the repertory area assigned to station S1 in the slot addressed by the registered code. Accordingly, slot 38 in repertory drum 30 is interrogated; the directory number priorly stored there is read out and returned to originating register 5 to cause completion of a connection to the location indicated by the directory number as set forth in the Busch patent.

It will be obvious from an inspection of FIG. 2, that upon the completion of an outward connection from the auxiliary appearance, a continuous voice path exists between the regular and the auxiliary appearance via condensers 28 and 29. It will be further noted by an inspection of FIG. 2 that prior to the operation of relay 8AS, the regulator appearance of station S1 is continuous through to station S1 for purpose of incoming and outgoing calls in the conventional fashion. It may also be noted that after the operation of relay 8AS7 and prior to the aforedescribed operation of relay 2RD that outgoing connections may be established from station S1 via the regular appearance in the well-known manner.

2.2. *Recording of the temporary transfer number and future time value in repertory drum 30*

We shall assume, as set forth hereinbefore in Section 1.2, that in response to a dial tone request station S1 has been connected to repertory change register trunk 22, and has indicated a desire to perform a write function in connection with a special service feature.

Referring to FIGS. 3 through 8, as set forth in detail in the Malthaner et al. patent, steering circuits STRA and STRB steer the first two digits dialed by station S1 into their respective AND gates and toggles thereby recording the prefixed code dialed by the special service customer. In similar fashion other steering circuits, such as steering circuit STU, cause the registration of the directory number subsequently dialed by the customer. In the instant embodiment, in similar fashion, steering circuits STHT, STHU, STMT, and STMU are added to repertory change register trunk 22 to permit the subsequent registration of four digits indicating, in respective sequence, the hour tens digit, hour units digit, minute tens digit and minute units digit. These latter four digits indicate the desired amount of time in hours and minutes which is to elapse before this feature is to be activated.

Deviating momentarily, it will be recognized that although the instant embodiment provides an arrangement whereby a privileged station may indicate the amount of time which is to elapse by the dialing of a four-digit code, it is obvious that numerous other arrangements may be provided in lieu thereof. Thus, for example, such a code could indicate the subsequent point in time directly, or could be smaller or larger in quantity of digits so as to indicate a time interval significant in terms of any period ranging from days or greater to seconds or less. It is further obvious that the use of a four-digit code will permit a period of time to elapse equivalent to at least 100 hours using conventional notation. However, we shall assume for purpose of explanation that the maximum interval available for delay is 96 hours or a period of four days.

Proceeding again with the description; upon the recording of the units digit of the directory number dialed by the privileged customer, steering circuit STHT is activated in the same fashion as the priorly activated steering circuits of repertory change register trunk 22. The enabling of steering circuit STHT is also arranged to re-enable gating amplifier 985 which, as set forth in detail in the Malthaner et al. patent, causes the return of a dial tone signal to the connected line. In response to this signal the subscriber at station S1 dials the interval of time which is to elapse before the temporary transfer feature is to be activated. For purpose of explanation, we shall assume this to be a 24-hour interval. Accordingly, the digits 2400 are registered in the respective HT through MU AND gates and toggles (not shown) in the well-known two-out-of-five basis.

As set forth in detail in the Malthaner patent, upon the registration of the required information in repertory change register trunk 22, repertory administrator 1030 is selected via lockout connector 1025. Upon the completion of this connection, the information stored in repertory change register trunk 22 is forwarded to repertory administrator 1030. As set forth in the Malthaner patent, this information is thereupon recorded in repertory drum 30 in the repertory area assigned to station S1. Accordingly, the directory number information is recorded in the particular slot addressed by the digits 38 which we have assumed to be a temporary transfer activate code. In the instant embodiment, in the same slot addressed by the digits 38, provision is made for the recording in parallel fashion of a time value represented by hour tens data, hour units data, minute tens data and minute units data in the well-known two-out-of-five basis.

Prior to describing the manner in which this additional information is recorded on magnetic drum 30, certain of the circuit units shown in block form on FIGS. 4, 5, and 8 will be explained.

Clock source 41 comprises any one of a number of configurations well known in the art arranged to provide a digital output indicating the current time on a two-out-of-five basis. Clock source 41 is advantageously arranged to provide this information at one minute intervals on a free running basis, recycling every 96 hours.

Variable adder logic circuit 42 comprises any one of a number of configurations well known in the art such that in response to two distinct digital inputs provided on a two-out-of-five basis, a distinct digital output, ranging from 0000 to 9600, constituting the sum of two inputs will be provided on a two-out-of-five basis.

Comparator circuit 51 comprises any one of a number of configurations well known in the art in which two distinct digital inputs are compared and an output indication provided in response to a match between the two inputs, and also in response to a specified one of said inputs exceeding the value of the other input.

Counter circuit 81 comprises any one of a number of configurations well known in the art such that in response to each input pulse a corresponding pulse is provided on an individual one of a plurality of output leads in sequence.

Figure 4:
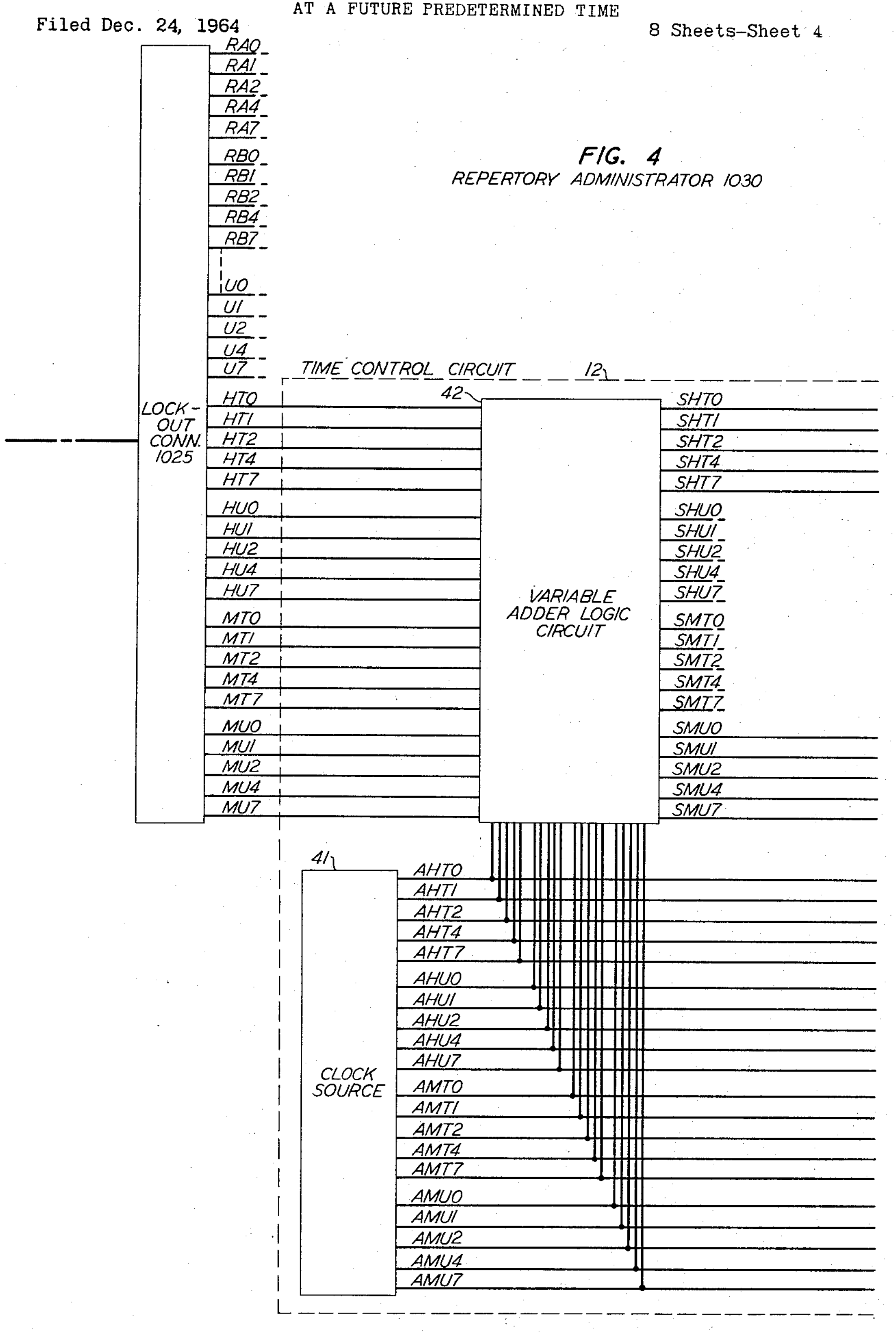
Figure 5:
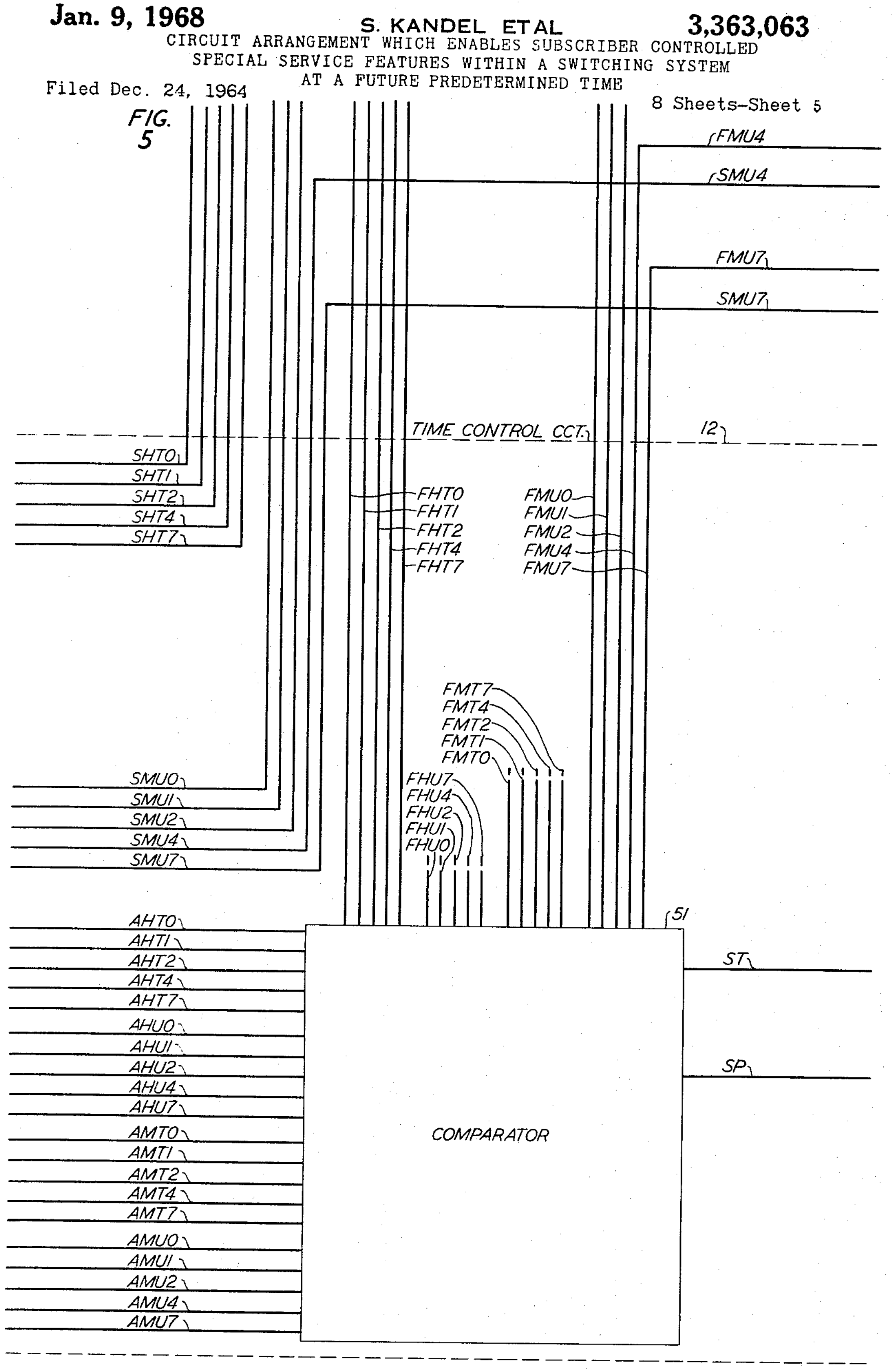
Figure 6:
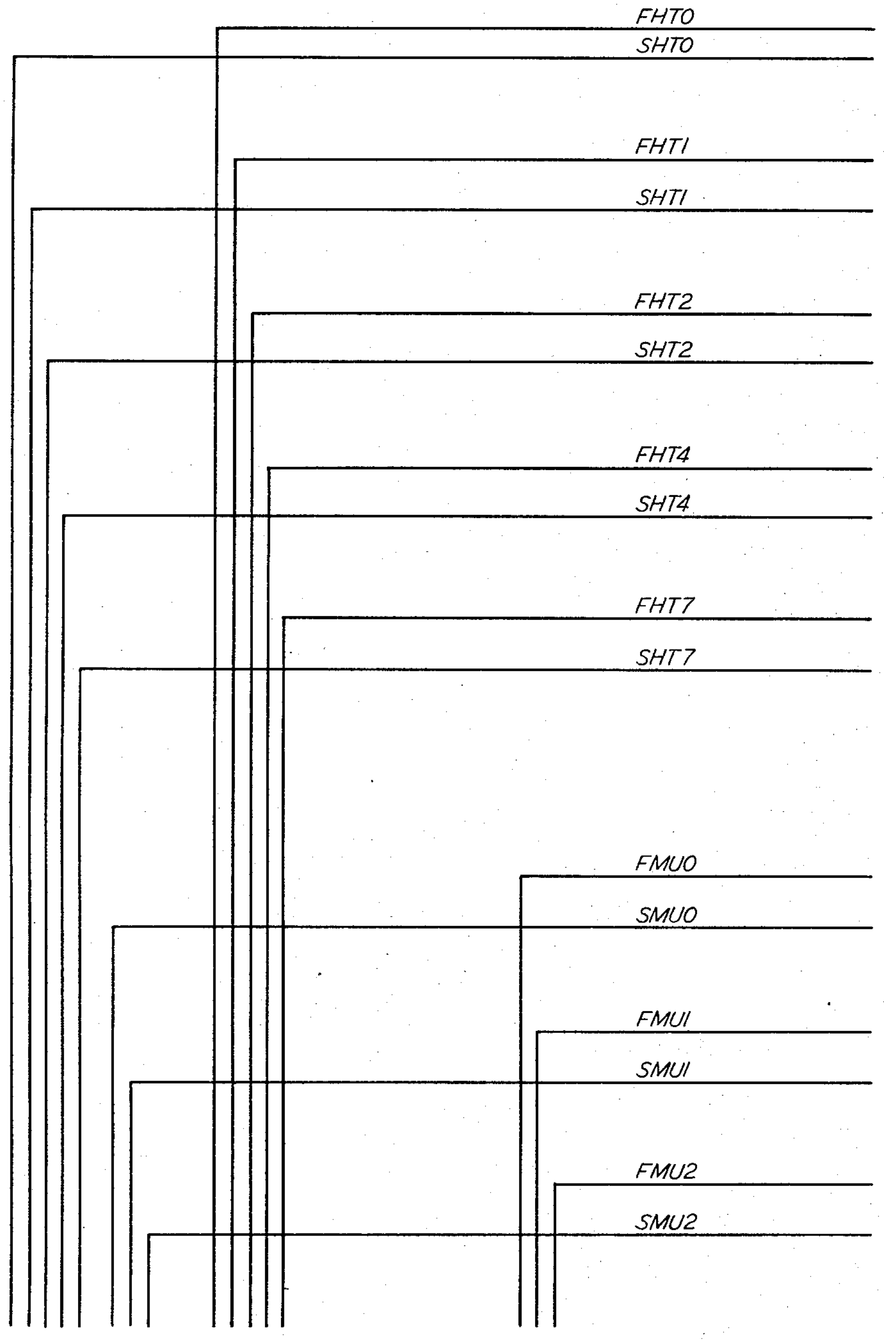
Figure 7:
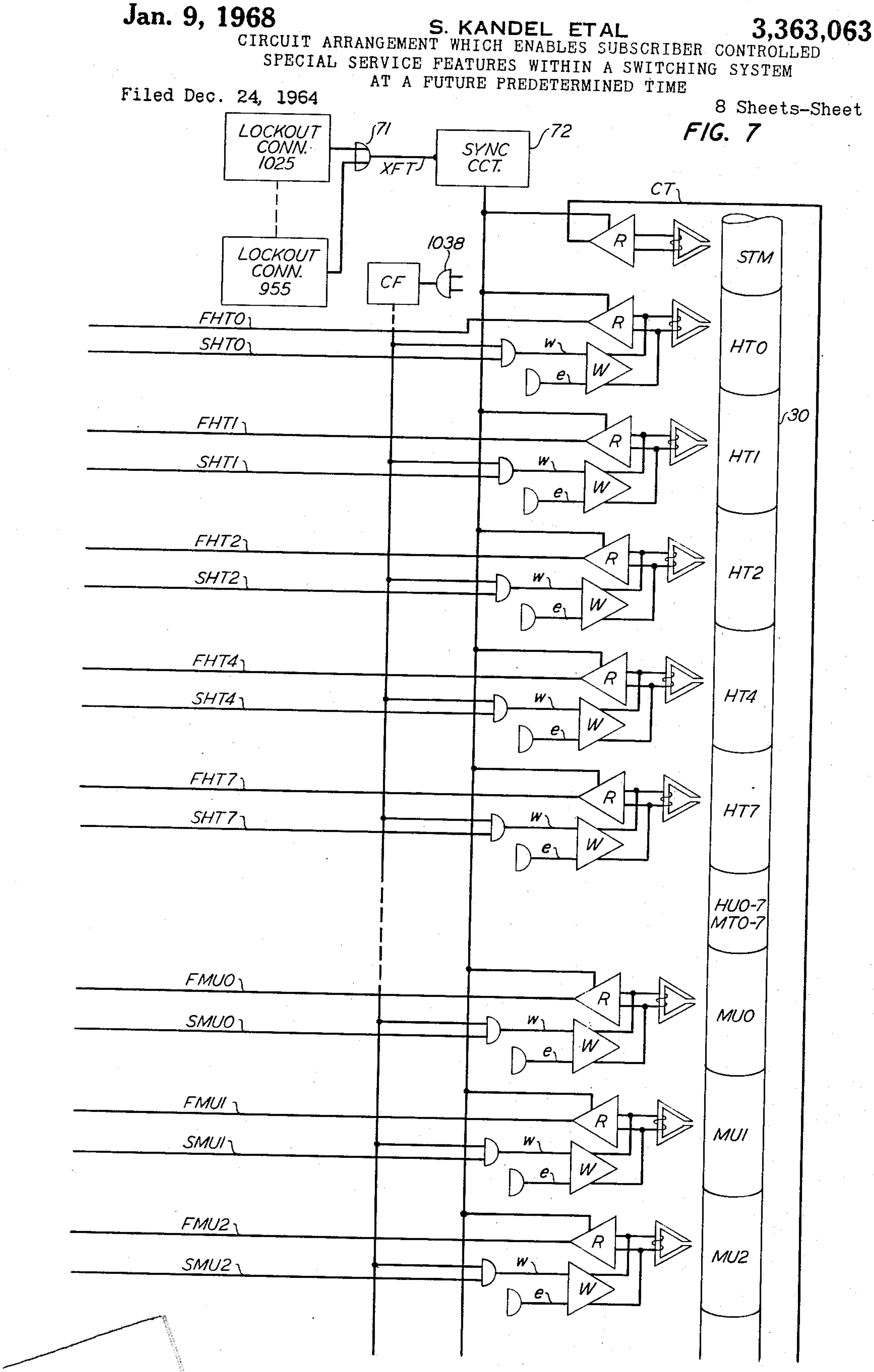

Proceeding now with the description; referring to FIG. 4, the hour tens and hour units digit information and the minute tens and minute units digit information provided on the HT two-out-of-five, HU two-out-of-five, MT two-out-of-five, and MU two-out-of-five leads, respectively, from repertory change register trunk 22 are forwarded as an input to variable adder logic circuit 42. Concurrently therewith the output of clock source 41 is also provided as an input to variable adder logic circuit 42. As a result the output leads of logic circuit 42, as manifested by the SHT two-out-of-five, SHU two-out-of-five, SMT two-out-of-five, and SMU two-out-of-five leads, constitute a time value which is the sum of the present time value manifested by clock source 41 and the elapsed time value manifested by the information received via lockout connector 1025. The information present on the output leads of logic circuit 42 is written in the appropriate magnetic cells of repertory drum 30 in FIG. 7 via the writing pulse extended from AND gate 1038 as set forth in detail in the Malthaner et al. patent.

Upon the completion of the write function repertory administrator 1030 and the associated circuits release as set forth in detail in the Malthaner et al. patent. Summarizing momentarily, at this time the information necessary for the functioning of the temporary transfer feature for station S1 has been recorded in the station S1 memory slot of magnetic drum 30. In addition thereto, a future time value has been recorded which indicates the subsequent point in time at which the feature should be activated.

Continuing now with the description; as described in detail in the Malthaner et al. patent, access to repertory drum 30 is provided by lockout connectors such as lockout connectors 1025 and 955. In the instant arrangement employing techniques well known in the art, the released state of all of these lockout connectors is advantageously employed to maintain OR gate 71 inoperative. Thus, the enabling of any of these connectors will enable OR gate 71 to provide an output indication on lead XFT to inhibit the operation of sync circuit 72. The absence of this output indicates that the lockout connectors are inactive, whereupon sync circuit 72 provides pulses on lead FT suitable to activate the read amplifiers associated with repertory slots on drum 30 containing the future time value. Accordingly, as the drum rotates, the information which is contained in parallel fashion in slot 38 for each such line is read from magnetic drum 30, and is forwarded on a two-out-of-five basis as an input to comparator circuit 51, via leads FHTO–7, FHUO–7, FMTO–7, and FMUO–7. As shown in FIGS. 4 and 5 the output of clock source 41 is provided as an input to comparator circuit 51. Accordingly, comparator circuit 51 provides a constant comparison between the future time value information read from repertory drum 30 and the current time value information provided by clock source 41. When a match exists between these two inputs or when the current time value exceeds the stored time value, an output signal is provided on the comparator circuit ST lead.

As set forth in detail in the Malthaner et al. patent, as the drum revolves, at the beginning of each repertory area an STM mark is encountered to indicate the beginning of a new area. This signal is forwarded via the CT lead to counter circuit 81 so as to cause that circuit to partially enable an AND gate such as AND gate 91 associated with the particular slot being compared at this time. Thus, when the STM mark for the area assigned to station S1 is encountered, a suitable input signal is provided on lead 2 of AND gate 91.

In the instant arrangement, the final cell (TT, FIG. 8) of the slot addressed by the digits 38 for each temporary transfer line has recorded therein a permanent mark identifying the particular slot assigned for temporary transfer activation. Accordingly, when the reading heads are located directly over the slot assigned to the code 38, a TT indication will be provided on lead 3 of AND gate 91. Thus AND gate 91 will be enabled only in response to a concurring signal on lead 1 from the ST lead of comparator circuit 51. Assuming that a match were to be obtained at this time between the current time information provided by clock source 41 and the stored future time value information, the output signal on lead ST enables AND gate 91 which thereupon enables flip-flop 95 in transfer circuit 7. Flip-flop 95 provides a positive output signal which completes the operate path of relay 8AS7 to thereby enable transfer circuit 7 as hereinbefore described.

Relay 8AS7 locks operated through enabled make contact 2 to ground. The concurrent enabling of make contact 8AS7–3 resets flip-flop 95. The enabling of break contact 8AS7–1 interrupts the continuity of the ST7 lead from AND gate 91 through to flip-flop 95.

Accordingly, a subsequent incoming connection to the regular appearance of station S1 is forwarded via the auxiliary appearance of station S1 to the called destination manifested by information read from repertory drum 30 as hereinbefore described.

2.3. *Deactivation of the temporary transfer feature*

We shall assume that the subscriber at station S1 returns to that station location and desires the deactivation of the temporary transfer feature at this time. The subscriber accordingly dials the digit 38 followed by a code comprising the digits 0000, which may be uniquely provided as an indication that the priorly activated temporary transfer feature is to be deactivated. This information is forwarded through repertory change register trunk 22, lockout connector 1025 and repertory administrator 1030 as hereinbefore described.

Variable adder logic circuit 42 is arranged, employing techniques well known in the art, such that in response to an input constituting 0000 an output is provided which disregards the other input from clock source 41. Thus, the output of variable adder logic circuit 42 constitutes the digits 0000 at this time. As hereinbefore described, these digits are recorded in repertory drum 30 in the slot addressed by the digits 38 and thus replace the priorly stored future time value indication. Upon the release of repertory administrator 1030, sync circuit 72 is reactivated. When the read heads return to a position addressed by the digits 38, the deactivation code is read out and provided as an input to comparator circuit 51. Comparator circuit 51 is arranged, empolying techniques well known in the art, such that in response to an input signal manifesting the digits 0000, an output is provided on the SP lead. Accordingly, AND gate 92 is enabled and provides a signal via the DS7 lead so as to enable flip-flop 96 in transfer circuit 7. Flip-flop 96 is arranged similar to flip-flop 95 such that an output signal constituting a ground potential is provided sufficient to cause the shunt release of relay 8AS7 by an obvious circuit. The release of relay 8AS7 restores its break contact 4 thereby resetting flip-flop 96 and thus transfer circuit 7 returns to normal.

While the equipment of this invention has been described with reference to a particular embodiment wherein an automatic switching system provided with memory equipment is arranged to enable temporary transfer control circuitry at a future time under control of information transmitted by an associated station, it is to be understood that such an embodiment is intended to be illustrative of the principles of the invention and that numerous other arrangements may be devised by those skilled in the art without departing from the spirit and scope of the invention.

For example, the invention may be used in a system wherein a fixed time delay is provided automatically in response to the reception of information required for the functioning of a special service feature.

A further example would be the use of the invention in an arrangement wherein a special service feature is immediately or subsequently enabled and a variable time value is transmitted by the associated station to indicate a subsequent deactivation of the feature.

Another example would be the use of the invention in an arrangement employing data process machines such that these machines are interconnected and disconnected for varying time intervals based upon priorly received time value information.

The use of the invention in conjunction with temporary transfer may be enhanced by including an announcement device to indicate to a subsequent calling party that the call is being transferred.

Another example would be the use of the invention in an arrangement wherein the memory control equipment is arranged to permit the storage of a plurality of transfer directory numbers for subsequent series activation at a respective plurality of different times.

Another example would be the use of the invention in an arrangement wherein the special service subscriber equipment is enabled to cause the storage of a directory number in conjunction with signals indicating an indefinite future time activation thereby permitting subsequent activation by the special service subscriber from a remote location by the mere dialing of the priorly stored transfer directory number.

What is claimed is:

1. In a switching system,
a line,
memory means operable in response to signals from said line for storing a future time value,
a source of present time value,
means for comparing said future time value with said present time value and
means responsive to a match in said comparing means for indicating said match to said line.

2. In a switching system,
the combination set forth in claim 1 further comprising means associated with said line for providing special service, and means responsive to said match indication for enabling said special service means.

3. In a switching system the combination set forth in claim 2 further comprising means responsive to further signals from said line for inhibiting said special service means.

4. In a switching system,
a line comprising auxiliary control means,
memory means operable in response to signals from said line for storing a future time value,
a source of present time value, and
means controlled by said memory means and said present time value source for enabling said auxiliary control means.

5. In a switching system,
a plurality of stations each comprising selectively operable signaling means,
means associated with one of said stations for providing said one station with special service,
control means operative in response to signals from said one station for storing special service information including a future time value,
a source of present time value,
means for comparing said future time value with said present time value and
means responsive to a match in said comparing means for enabling said special service means.

6. In a switching system,
a station comprising signaling means,
register means connectable to said station and operable to record digital control information transmitted from said station signaling means,
memory means controlled by said register means and operable to store said digital control information,
means for thereafter interrogating said memory to read out a portion of said control information and
means for subsequently activating special service equipment at said station upon the elapse of an interval of time determined by said portion of said control information.

7. In a switching system,
a station,
means for providing special service,
means operable in response to signals from said station for registering an arbitrary time value,
means for translating said arbitrary time value into a future time value,
means for storing said future time value,
a source of present time value,
means for comparing said future time value with said present time value and
means responsive to a match in said comparing means for enabling said special service means.

8. In a switching system the combination set forth in claim 7 wherein said translating means comprises an adder circuit operable to provide the arithmetic sum of said arbitrary time value and said present time value.

9. The combination set forth in claim 7 wherein said comparing means comprises means for indicating a match when said present time value equals said future time value and also when said present time value exceeds said future time value.

10. In a telephone system,
a plurality of lines including a special service line,
transfer means operable in response to signals from said special service line for rerouting subsequent incoming calls to another line,
a memory,
means responsive to other signals from said special service line for storing a selected time value in said memory,
means for comparing said selected time value with the current time value, and
means responsive to a match in said comparing means for enabling said transfer means.

11. In a telephone system,
a plurality of lines including a special service line,
transfer means operable in response to signals from said special service line for rerouting subsequent incoming calls to another line,
means responsive to other signals from said special service line for registering an arbitrary selected time value,
means for providing time value output indications in predetermined stepped increments,
means for combining said registered time value with the current time value output indication,
means for storing the combined time value,
means for comparing said stored time value with subsequent time value output indications and
means responsive to a match in said comparing means for enabling said transfer means.

12. In a telephone switching system,
a switching network,
a plurality of stations each having a regular appearance in said network,
one of said stations comprising special service means including an additional appearance in said network,
register means connectable to said one station and operable to record a plurality of digits transmitted by said station indicating an arbitrary time value,
memory means,
a source of present time value,
a logic circuit operative in response to an input from said source indicating the present time value and from said register means indicating said registered arbitrary time value for providing a future time value output,
means controlled by said logic circuit for writing said future time value in said memory means,
means for reading out said future time value from said memory means, and
means controlled by said reading means and said present time value source for enabling said special service means.

13. In a telephone switching system the combination set forth in claim 12 further comprising means responsive to the completion of the writing operation for deactivating said memory means and for enabling said reading means.

14. In a telephone system the combination set forth in claim 12 further comprising means responsive to enablement of said special service means for associating said additional appearance with said one station regular appearance.

No references cited.

KATHLEEN H. CLAFFY, *Primary Examiner.*

A. H. GESS, *Assistant Examiner.*